United States Patent
Lawrenson et al.

(10) Patent No.: US 9,769,911 B2
(45) Date of Patent: Sep. 19, 2017

(54) LIGHTING SYSTEM

(71) Applicant: PHILIPS LIGHTING HOLDING B.V., Eindhoven (NL)

(72) Inventors: Matthew John Lawrenson, Eindhoven (NL); Julian Charles Noland, Eindhoven (NL); Alexander Henricus Waltherus Van Eeuwijk, Eindhoven (NL); Hilbrand Vanden Wyngaert, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/316,263

(22) PCT Filed: May 27, 2015

(86) PCT No.: PCT/EP2015/061655
§ 371 (c)(1),
(2) Date: Dec. 5, 2016

(87) PCT Pub. No.: WO2015/185402
PCT Pub. Date: Dec. 10, 2015

(65) Prior Publication Data
US 2017/0156196 A1    Jun. 1, 2017

(30) Foreign Application Priority Data
Jun. 5, 2014 (EP) .................................. 14171305

(51) Int. Cl.
*H05B 33/08* (2006.01)
*H05B 37/02* (2006.01)

(52) U.S. Cl.
CPC ..... *H05B 37/0272* (2013.01); *H05B 33/0854* (2013.01); *H05B 33/0872* (2013.01)

(58) Field of Classification Search
None
See application file for complete search history.

(56) References Cited

U.S. PATENT DOCUMENTS

| | | |
|---|---|---|
| 6,265,984 B1 | 7/2001 | Molinaroli |
| 2003/0218537 A1 | 11/2003 | Hoch et al. |

(Continued)

FOREIGN PATENT DOCUMENTS

| | | |
|---|---|---|
| KR | 20030026496 A | 4/2003 |
| WO | 0017737 A1 | 3/2000 |

(Continued)

OTHER PUBLICATIONS

Seung-Tak Noh et al, "Lighty: A Painting Interface for Room Illumination by Robotic Light Array", The Univ. of Tokyo, JST ERATO Igarashi Design Interface Project.

(Continued)

*Primary Examiner* — Dedei K Hammond

(57) ABSTRACT

A lighting system comprising: one or more lighting devices operable to emit light into an environment; a controller coupled to the lighting device(s), the controller comprising an input for receiving position and/or orientation information of a wireless communication device; and a wireless receiver coupled to said controller; wherein the controller is configured to: receive parameters from said wireless communications device via the wireless receiver based on a first interaction between a user and the wireless communication device; determine a spot in said environment towards which the wireless communication device is directed based on the received position and/or orientation information; and during a second interaction, track movement of the spot based on the received location and/or orientation information, and control the lighting device(s) to emit light onto a region in (Continued)

said environment defined by the movement of the tracked spot based on at least one of the received parameters.

19 Claims, 6 Drawing Sheets

(56) References Cited

U.S. PATENT DOCUMENTS

| | | | | |
|---|---|---|---|---|
| 2008/0197782 A1* | 8/2008 | Frumau | ............ | H05B 37/0272 |
| | | | | 315/151 |
| 2014/0285993 A1* | 9/2014 | Fisher | .................. | G03B 15/03 |
| | | | | 362/6 |
| 2015/0091446 A1* | 4/2015 | Ohta | .................. | H05B 37/029 |
| | | | | 315/153 |

FOREIGN PATENT DOCUMENTS

| | | |
|---|---|---|
| WO | 2004062120 A2 | 7/2004 |
| WO | 2006111927 A1 | 10/2006 |

OTHER PUBLICATIONS

Seung-Tak Noh et al, "Design and enhancement of painting interface for room lights", Vis Comput, DOI 10.1007/s00371-013-0872-7.

* cited by examiner

LIGHTING SYSTEM

CROSS-REFERENCE TO PRIOR APPLICATIONS

This application is the U.S. National Phase application under 35 U.S.C. §371 of International Application No. PCT/EP2015/061655, filed on May 27, 2015, which claims the benefit of European Patent Application No. 14171305.7, filed on Jun. 5, 2014. These applications are hereby incorporated by reference herein.

TECHNICAL FIELD OF THE INVENTION

The present disclosure relates to a lighting system and the control thereof using a mobile device.

BACKGROUND OF THE INVENTION

Known lighting devices can be controlled using mechanical switches to turn the lighting devices on or off, or to dim up and down the amount of light emitted by the lighting device.

More recently lighting system utilizing audio based control of lighting devices have been developed.

Connected lighting systems have been growing popularity in recent times. An example of a connected lighting system is the Philips "Hue" lighting system. The Philips "Hue" lighting system comprises one or more lighting devices, a software application executed on a device, and a bridge connected to wireless access point which enables the one or more lighting devices to be controlled by a user of the device using the software application. The brightness and color of the light emitted from the lighting device(s) can be varied and controlled. In particular, the user may vary and control the brightness and color of the light emitted from the lighting device(s) by using the software application.

The software application provides a lighting control user interface displayed on a display of the device. The lighting control user interface enables the user to select one or more lighting devices and select various parameters for those lighting devices, the user then selects a scene (a colorful image) and then the lighting system modifies the settings of the lighting device(s) to best adjust to that scene.

SUMMARY OF THE INVENTION

The inventors have recognized that a user may prefer to modify the implementation of color within a room as if they were painting. This is not currently possible using the known lighting techniques listed above.

According to one aspect disclosed herein, there is provided a controller comprising an output for controlling one or more lighting device to emit light into an environment; and one or more input for receiving position and/or orientation information of a wireless communication device and user-defined parameters transmitted from said wireless communications device based on a first interaction between a user and the wireless communication device; wherein the controller is configured to determine a spot in said environment towards which the wireless communication device is directed based on the received position and/or orientation information and during a second interaction, detect movement of the wireless communication device and track movement of the spot based on the received location and/or orientation information, and control the one or more lighting devices to emit light onto a region in said environment defined by the movement of the tracked spot based on at least one of the received parameters. The controller may be configured to determine the spot in said environment towards which the wireless communication device is directed based on one or more of said parameters in addition to the received position and/or orientation information.

The one or more of said parameters used to determine the spot in said environment towards which the wireless communication device is directed may comprise a size and/or shape of the spot.

The at least one of the received parameters may comprise a mode indicating how the light emitted onto said region by the one or more lighting devices is to be modified.

The at least one of the received parameters may comprise one or more attributes of the light to be emitted onto said region by the one or more lighting devices.

The one or more attributes comprise a color of the light to be emitted onto said region by the one or more lighting devices.

The one or more attributes comprise a softness of the light to be emitted onto said region by the one or more lighting devices.

The controller may be configured to select the one or more lighting devices to be controlled based on a determination that the one or more lighting devices are positioned in said environment to emit light onto said region.

The controller may be coupled to a memory storing position information of the one or more lighting devices, and the controller may be configured to make said determination based on comparing said region with the position information.

The controller may be configured to select the one or more lighting devices to be controlled based on capabilities of the one or more lighting devices.

According to another aspect, there is provided a lighting system comprising a controller according to any of the embodiments described herein; one or more lighting devices coupled to said controller, the one or more lighting devices operable to emit light into an environment; and a wireless receiver coupled to said controller, the wireless receiver configured to receive said parameters.

The input may be coupled to the wireless receiver, the wireless receiver configured to receive the position and/or orientation information of the wireless communication device transmitted from said wireless communication device.

The lighting system may further comprise a sensor coupled to said input, the sensor configured to detect the position and/or orientation information of the wireless communication device.

The sensor may comprise one or any combination of a complementary metal oxide semiconductor image sensor, a charge coupled device image sensor, and a time of flight sensor.

According to another aspect of the present disclosure there is provided a computer program product for to control a lighting system comprising one or more lighting devices operable to emit light into an environment, the computer program product comprising code embodied on a computer-readable medium and being configured so as when executed on a processor configured, to: receive position and/or orientation information of a wireless communication device, and user-defined parameters transmitted from said wireless communications device based on a first interaction between a user and the wireless communication device; determine a spot in said environment towards which the wireless communication device is directed based on the received position and/or orientation information; and during a second interaction, detect movement of the wireless communication device and track movement of the spot based on the received location and/or orientation information, and control the one or more lighting devices to emit light onto a region in said environment defined by the movement of the tracked spot based on at least one of the received parameters.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION OF THE DRAWINGS

Figure 1:
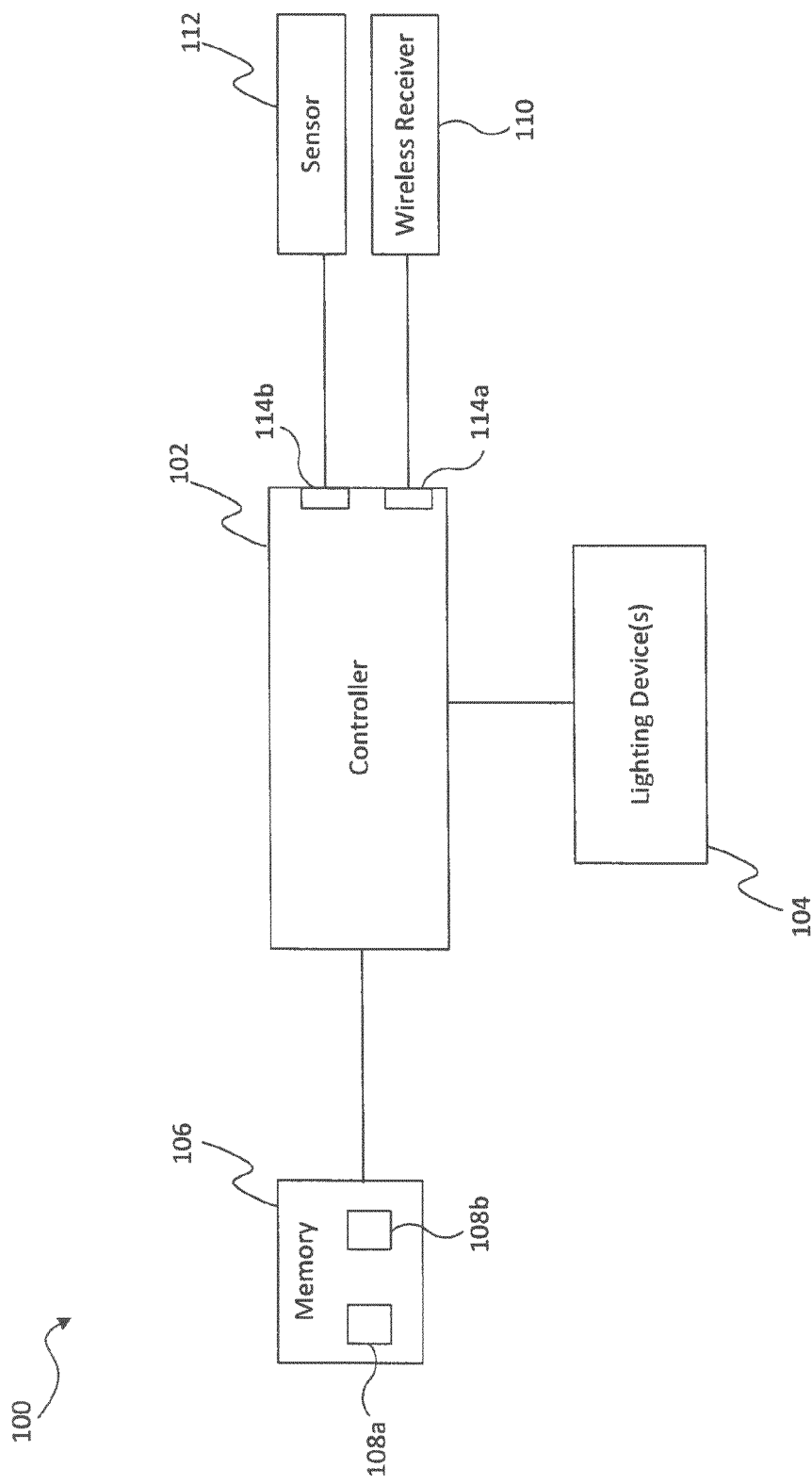
FIG. 1 is a schematic block diagram of a lighting system.

Reference is first made to FIG. 1 which illustrates a schematic block diagram of a lighting system 100.

The lighting system 100 comprises a controller 102 coupled to one or more lighting devices 104 operable to emit light to illuminate an environment of the lighting system 100. The lighting system 100 may be placed in an environment comprising an indoor space such as an office space, an interior space within a home, a laboratory etc. or an outdoor space such as a courtyard, marquee, garden etc. The controller 102 may be coupled to the lighting device(s) 104 via a wired or wireless connection. The lighting device(s) 104 have adjustable settings which will be described in further detail below. The lighting device(s) 104 may for example comprise Light Emitting Diodes (LEDs). The lighting device(s) 104 may be integrated into one or more structures for example a textile to form a luminous textile panel, or other structure to form a luminous surface.

The functionality of the controller 102 described herein may be implemented in code (software) stored on a memory (e.g. memory 106) comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the controller 102 is implemented in dedicated hardware circuitry, or configurable hardware circuitry like a field-programmable gate array (FPGA).

The controller 102 is configured to control the lighting device(s) 104 by transmitting appropriate control signals to the lighting device(s) 104.

The controller 102 comprises an input 114a coupled to a wireless receiver 110. The wireless receiver 110 is configured to receive data from a wireless communications device 200 in the environment of the lighting system 100 via a wireless connection. Persons skilled in the art will be familiar with such wireless technologies such as Bluetooth and Wi-Fi and therefore for reasons of clarity these are not discussed in detail herein. The wireless communications device 200 will be described in more detail with reference to FIG. 2.

Referring back to FIG. 1, the controller 102 may comprise an input 114b coupled to a sensor 112. The sensor 112 is configured to detect the position and/or orientation of the wireless communications device in the environment of the lighting system 100.

The sensor 112 may comprise one or more optical imaging sensor for example a CMOS (complementary metal oxide semiconductor) image sensor, or a CCD (charge coupled device) image sensor. In another example the optical imaging sensor may be a time of flight sensor comprising a time-of-flight sensing element. The time-of-flight sensing element is able to sense radiation emitted from an emitter, and this sensing is synchronized with the emission of the radiation from the emitter. The emitter may be a dedicated emitter which may be part of the time of flight sensor. In this case the emitted radiation may be radiation other than visible light, e.g. infrared, RF or ultrasound, in order not to intrude upon or be confused with the visible light in the environment of the lighting system 100; or the radiation could be visible light modulated with an identifiable signal to distinguish it from the rest of the light in the environment of the lighting system 100.

Some of the emitted radiation will be reflected from an object back towards the time of flight sensor. As it is synchronized with the emission, the time of flight sensor can be used to determine the amount of time between emission from the emitter and reception back at the sensing element, i.e. time-of-flight information. Further, the sensing element takes the form of a two-dimensional pixel array, and is able to associate a time-of-flight measurement with a measurement of the radiation captured by some or all of the individual pixels. Thus the time-of-flight sensor is operable to capture a depth-aware or three-dimensional image in its sensing region, including a detected object. In the case where the sensing element captures visible light, the time-of-flight sensor may also be referred to as a depth-aware or 3D camera. By applying image recognition to the depth-aware or 3D images captured by the time of flight sensor, it is possible to detect information such as the position and/or orientation of the wireless communications device 200 in the environment of the lighting system 100. Details of time-of-flight based image sensing in themselves will be familiar to a person skilled in the art, and are not described in any further detail herein.

The sensor 112 may alternatively or additionally comprise one or more non-optical sensor. For example the sensor 112 may comprise one or more beacons (e.g. Bluetooth beacons) to detect the position of the wireless communications device 200 in the environment of the lighting system 100. Other non-optical sensors such as sensors based on coded light could also be used to detect the position and/or orientation of the wireless communications device 200 in the environment of the lighting system 100. Such alternative sensors are well known to persons skilled in the art and are therefore not discussed in detail herein.

The controller 102 is coupled to a memory 106 (e.g. in the form of a non-transitory computer readable medium such as electronic or magnetic memory). The memory 106 stores a first look-up table 108a detailing the position of each of the lighting device(s) 104 in the environment of the lighting system 100. The memory 106 also stores a second look-up table 108*b* detailing position and/or orientation information of the wireless communications device 200 received by the controller 102.

Figure 2B:
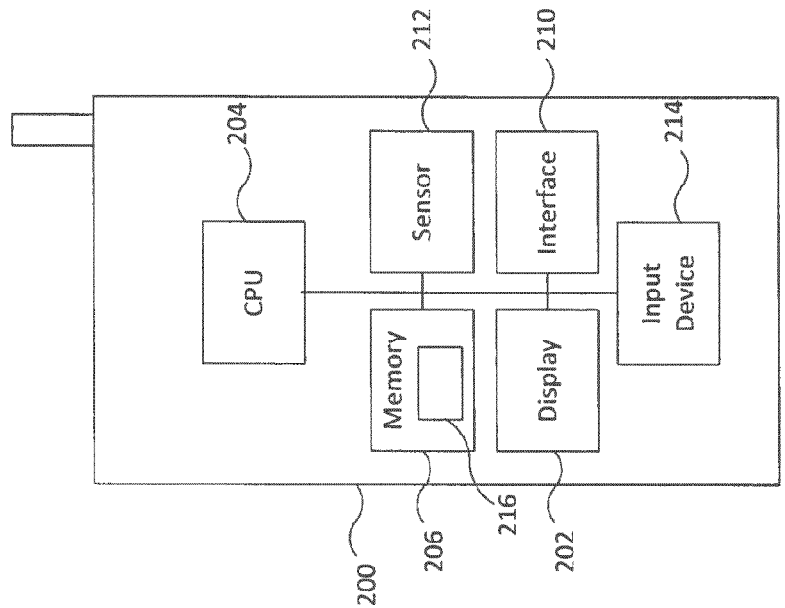
FIG. 2 is a schematic block diagram of an example wireless communication device.
Figure 2A:
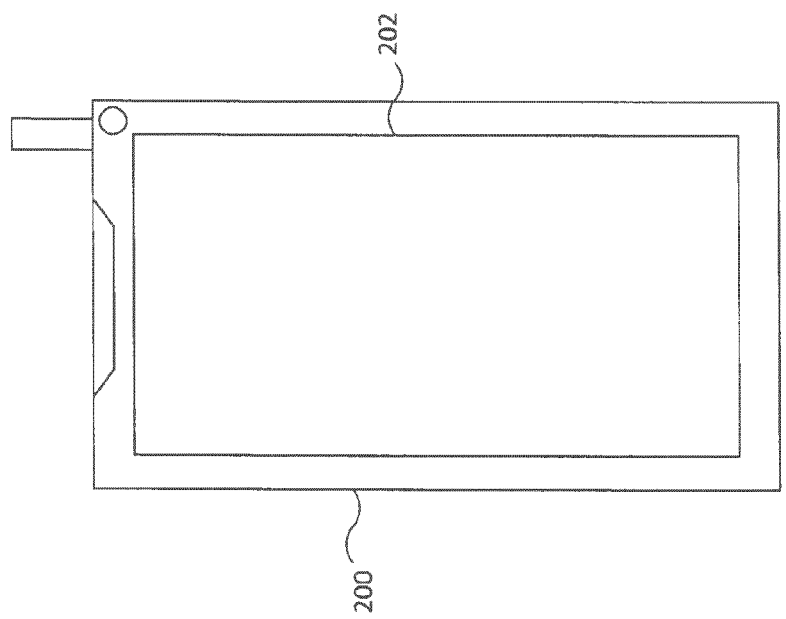

Reference is now made to FIGS. 2*a* and 2*b* which illustrates the wireless communications device 200 referred to above.

The wireless communications device 200 may for example be a mobile phone, a smartphone, a personal digital assistant ("PDA"), a tablet computer, a gaming device or any other embedded device able to communicate with the lighting system 100. The wireless communications device 200 is arranged to receive information from, and output information to, a user of the wireless communications device 200 (not shown in FIG. 2).

The wireless communications device 200 comprises a central processing unit ("CPU") 204, to which is connected a display 202 such as a screen or touch screen, a memory 206, an interface 210.

Figure 3:
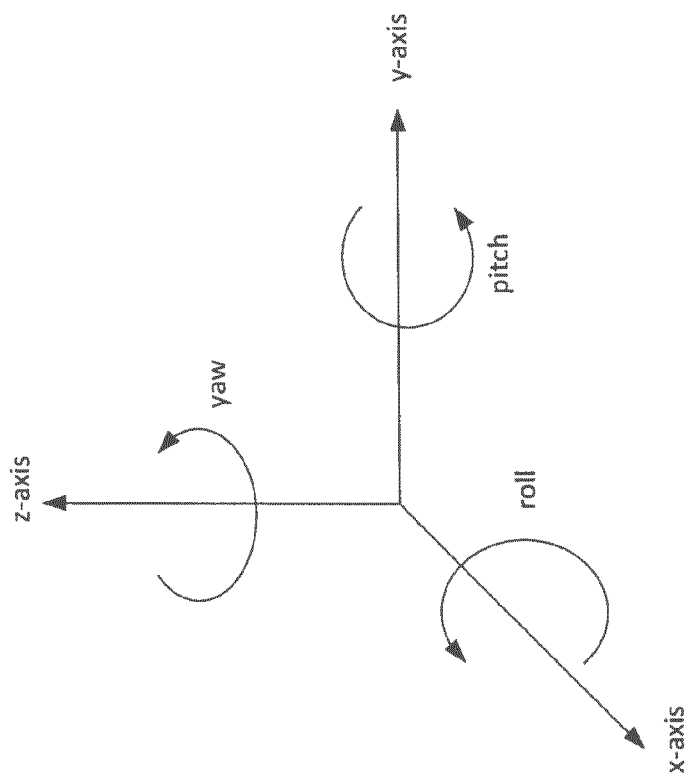
FIG. 3 shows a coordinate system.

The wireless communications device 200 may additionally comprise a sensor 212. The sensor 212 is configured to detect the position and/or orientation of the wireless communication device 200 in the environment of the lighting system 100. As used herein, the term "orientation" of the wireless communication device 200 refers to the degree of rotation with respect to one or more axes of rotation shown in the co-ordinate system of FIG. 3. The sensor 212 may comprise an inertial sensor. For example, the sensor 212 may comprise a gyroscope and/or an accelerometer and/or a magnetometer. The sensor 212 may provide a single or multi axis measurement(s). That is, the sensor 212 may provide a measurement pertaining to the movement along, and/or rotation about, one or more axes shown in the coordinate system of FIG. 3.

As an alternative, or in addition to the lighting system 100 detecting the position and/or orientation of the wireless communications device 200 in the environment of the lighting system 100 using sensor 112, the wireless communications device 200 may transmit the detected position and/or orientation of the wireless communication device 200 via the interface 210 to the lighting system 100. The wireless receiver 110 is configured to receive the detected position and/or orientation of the wireless communication device 200 that is transmitted from the wireless communication device 200 and supply this information to the controller 102 via input 114*a*.

For example, the controller 102 may to detect a spot in the environment of the lighting system 100 towards which the wireless communication device 200 is directed (e.g. pointed to) based on position and/or orientation information of the wireless communication device 200 received from an optical sensor via input 114*b*, and determine movement of the spot based on received position and/or orientation of the wireless communication device 200 (detected by a gyroscope on the device 200) received from the wireless receiver 110 via input 114*a*, for faster processing.

The wireless communications device 200 is installed with a lighting control software application 216, in that the lighting control software application 216 is stored in the memory 206 and arranged for execution on the CPU 204.

The lighting control software application 216 provides a user interface which is displayed on the display 202 of the wireless communications device 200. The lighting control software application 216 presents information to, and receives information from the user of the wireless communications device 200.

As will be described in more detail below, during a first interaction the user interacts with the lighting control software application 216 executed on the wireless communications device 200 to define a set of parameters that informs the lighting control software application 216 of the intention of the user with respect to how to control the lighting device(s) 104. The user may input the set of parameters by making appropriate selections using the touch screen 204. Alternatively or additional the user may input the set of parameters using an input device 214. The input device may be a keypad, microphone or any other input means. These parameters are transmitted from the wireless communications device 200 via the interface 210 and received by the controller 102 of the lighting system 100 via the wireless receiver 110.

Based on receiving position and/or orientation information of the wireless communication device 200 from the wireless receiver 110 via input 114*a* and/or from the sensor 112 via input 114*b*, the controller 102 is configured to detect a spot in the environment of the lighting system 100 towards which the wireless communication device 200 is directed (e.g. pointed to). As used herein, the term "spot" refers to a footprint to which light is to be applied, the footprint is not limited to being circular, although it can be.

During a second interaction, the user of the wireless communication device 200 moves the wireless communication device 200 and the wireless communication device 200 interacts with the lighting system 100 in a manner akin to a paintbrush applying color to a canvas. That is, the controller 102 is configured to track the movement of the spot based on the received location and/or orientation information, and control the lighting device(s) 104 to emit light onto a region in the environment of the lighting system defined by the movement of the tracked spot based on at least one of the received parameters.

This is described in more detail with reference is now made to FIG. 4 which illustrates a process 400 for controlling the lighting device(s) 104 of the lighting system 100.

At step S402, the user of the wireless communication device 200 selects, using the user interface provided by the lighting control software application 216, a mode in which light will be modified using a "Brush_Type" parameter. Examples of Brush_Types include:

"Eraser", which reduces color, or brightness.

"Pencil", which replaces the current color with a new color.

"Spray can", which adds a new color to an existing color. Thus, instead of a one-step color (or other effect) selection, the "Spray can" brush type enables an effect of a first type (e.g. color, dim level etc.) to be added on top of an effect of that same type already provided in the environment of the lighting system 100 by the lighting device(s) 104—the effect is therefore additive.

At step S404, the user of the wireless communication device 200 selects, using the user interface provided by the lighting control software application 216, the attributes of light to be applied using "Paint_Parameters". Examples of Paint_Parameters include: "Color", i.e. which color is to be applied.

"Finish", i.e. the property of light (e.g. the hardness/softness) to be applied.

At step S406, the user of the wireless communication device 200 selects, using the user interface provided by the lighting control software application 216, the geometric region relative to the wireless communication device 200 in a particular orientation that the modifications in light will be applied to.

Step S406 comprises the user of the wireless communication device 200 selecting, using the user interface provided by the lighting control software application 216, the relative area over which modifications will be applied using "Brush_Parameters". Examples of Brush _Parameters include:

"Size" indicating the desired size of brush (e.g. physical dimensions).

"Shape" indicating the desired shape of brush. The shape may be rectangular, circular or any other shape.

"Depth" indicating the desired depth of brush.

Step S406 additionally comprises the user of the wireless communication device 200 specifying, using the user interface provided by the lighting control software application 216, the Interaction_Length, parameter, which is the distance from the wireless communication device 200 in a particular orientation over which the modifications will be applied.

The geometric region relative to the wireless communication device 200 (otherwise referred to as a "spot" herein) is then calculated to produce the "Relative_Geometric_Region" parameter. An example of how this may be done is described with reference to FIGS. 5a and 5b.

Figure 5B:
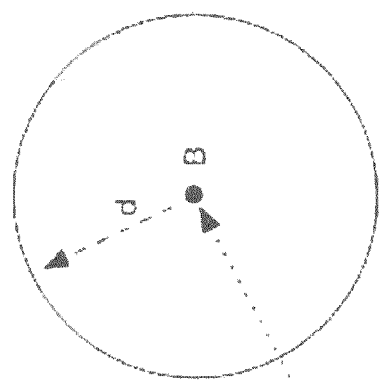
FIG. 5 illustrates how a geometric region relative to the wireless communication device is calculated.
Figure 5A:
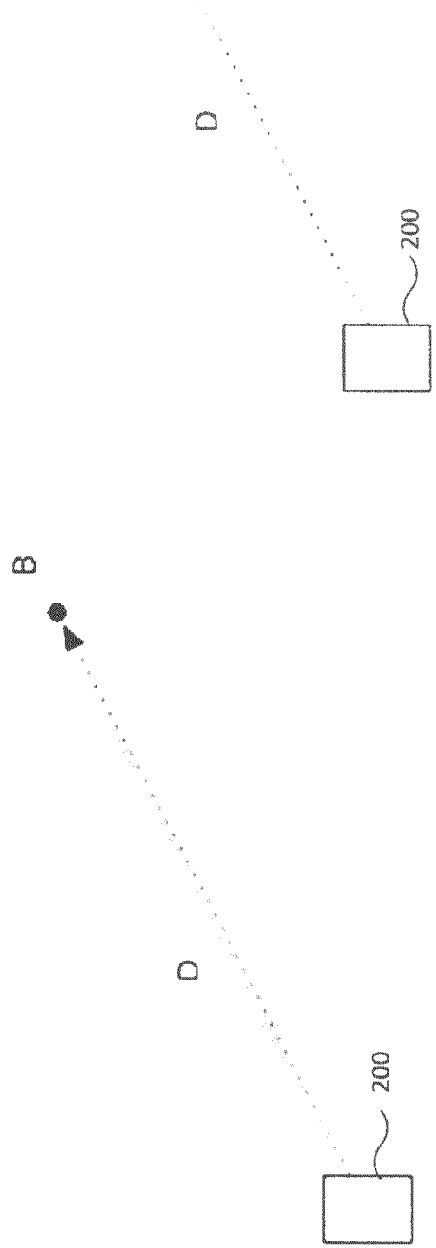

Firstly, the center of the brush stroke is calculated based on the Interaction_Length parameter. The Interaction_Length specifies the distance from the wireless communication device 200 to the center of one face of the geometric region. FIG. 5a illustrates the wireless communication device 200, the Interaction_Length (shown as D), and the center of the brush stroke (shown as B).

A two-dimensional shape is calculated based on the Size and Shape of the brush (provided by the user of the wireless communication device 200). An example two-dimensional shape calculated based on the user of the wireless communication device 200 specifying a circular brush of radius d, centered on the center of the brush stroke (B), is shown in FIG. 5b. Thus a two-dimensional shape is created in a plane that is, for example, perpendicular the user of the wireless communication device 200.

If provided, the Depth parameter provides a thickness to the two-dimensional shape to turn the two-dimensional shape into a three-dimensional shape.

This two or three dimensional shape defines a geometric region relative to the wireless communication device 200 (otherwise referred to as a "spot" herein) and is defined by the "Relative_Geometric_Region" parameter.

At step S408 a requested modification that can be applied to the geometric region relative to the wireless communication device 200 (calculated at step S406) is calculated. This requested modification, indicated by the parameter "Requested_Modification", is the change in light the user of the wireless communication device 200 wishes within the Relative_Geometric_Region, and is calculated using the parameters selected by the user of the wireless communication device 200 at steps S402 and S404.

For example, at step S402 the user of the wireless communication device 200 may select the "Pencil" Brush_Type parameter and at step S404 selects a color using RGB parameters r, g and b. In this scenario the parameter "Requested_Modification" indicates a requested modification to change the light in the Relative_Geometric_Region such that the light in the Relative_Geometric_Region has a new RGB values (R', G', B') of:

$R'=r$ $G'=g$ $B'=b$

In the above example, the parameter "Requested_Modification" indicates a requested modification to replace the existing color in the Relative_Geometric_Region with the color (r, g and b) selected by the user of the wireless communication device 200.

In another example, at step S402 the user of the wireless communication device 200 may select the "Eraser" Brush_Type parameter and at step S404 selects a color using RGB parameters r, g and b. In this scenario the parameter "Requested_Modification" indicates a requested modification to change the light in the Relative_Geometric_Region such that the light in the Relative_Geometric_Region has a new RGB values (R', G', B') of:

$R'=r-r/3$ $G'=g-g/3$ $B'=b-b/3$

In the above example, the parameter "Requested_Modification" indicates a requested modification to reduce the color (r, g and b) selected by the user of the wireless communication device 200 by a third in the Relative_Geometric_Region.

In yet another example, at step S402 the user of the wireless communication device 200 may select the "Spray Can" Brush_Type parameter and at step S404 selects a color using RGB parameters r, g and b. In this scenario the parameter "Requested_Modification" indicates a requested modification to change the light in the Relative_Geometric_Region such that the light in the Relative_Geometric_Region has a new RGB values (R', G', B') of:

$R'=r+10$ $G'=g+10$ $B'=b+10$

In the above example, the parameter Requested_Modification indicates a requested modification to add the color (r, g and b) selected by the user of the wireless communication device 200 to an existing color (r=10, g=10, b=10) in the Relative_Geometric_Region.

Note that the above examples are described to merely illustrate concepts of the present disclosure and are not limiting in any way.

At step S410, the user of the wireless communication device 200 may select, using the user interface provided by the lighting control software application 216, initial settings of the lighting device(s) 104, the initial settings may include:

"Blank Canvas", i.e. all of the lighting device(s) 104 are turned off.

"Current Settings", i.e. whichever configuration the lighting device(s) 104 are currently set to.

"Green Canvas", where the lighting device(s) 104 are set to emit a green color. Whilst this setting has been described with reference to a green color, the initial settings may include settings where the lighting device(s) 104 are set to emit other colors.

At step S410, the user may also specify a "Canvas Composition" which indicates which of the lighting devices 104 are to be included and thus be controlled by the controller 102 in the activity. For example in a large room with many lighting devices 104 that are to be included and thus be controlled by the controller 102 the canvas (area covered by the light footprints of the lighting devices 104 that are to be controlled by the controller 102) could be the whole room, whereas if only a sub-section of the lighting devices 104 are to be included and thus be controlled by the controller 102 the canvas could be a section of the room.

The initial settings of the lighting device(s) 104 are transmitted from the wireless communications device 200 via the interface 210 and received by the controller 102 of the lighting system 100 via the wireless receiver 110.

The parameter Relative_Geometric_Region may be calculated by the lighting control software application 216 and transmitted from the wireless communications device 200 via the interface 210 and received by the controller 102 of the lighting system 100 via the wireless receiver 110. Alternatively, the parameters (Brush_Parameters and Interaction_Length) used in the calculation of the Relative_Geometric_Region parameter may be transmitted from the wireless communications device 200 via the interface 210 and received by the controller 102 of the lighting system 100 via the wireless receiver 110, and the controller 102 may be configured to calculate the Relative_Geometric_Region parameter.

Similarly, the parameter Requested_Modification may be calculated by the lighting control software application 216 and transmitted from the wireless communications device 200 via the interface 210 and received by the controller 102 of the lighting system 100 via the wireless receiver 110. Alternatively, the parameters (Brush_Type and Paint_Parameters) used in the calculation of the Requested_Modification parameter may be transmitted from the wireless communications device 200 via the interface 210 and received by the controller 102 of the lighting system 100 via the wireless receiver 110, and the controller 102 may be configured to calculate the Requested_Modification parameter.

Once parameters have been supplied to the controller 102 of the lighting system 100 the user of the wireless communication device 200 moves the position and/or orientation of the wireless communication device 200. The movement being along one or more of the x,y,z axes shown in FIG. 3, and the change in orientation being rotation around its center point about one or more of the x,y,z axes shown in FIG. 3.

The controller 102 is configured to detect movement of the wireless communication device 200 at step S412 based on the position and/or orientation information of the wireless communication device 200 received from the wireless receiver 110 via input 114a and/or from the sensor 112 via input 114b. The controller 102 is configured to store received position and/or orientation information of the wireless communication device 200 in the second look-up table 108b.

In response to detecting movement of the of the wireless communication device 200 the process proceeds to step S414.

At step S414, the Relative_Geometric_Region parameter plus the trajectory of motion (determined based on previously received position and/or orientation information of the wireless communication device 200 stored in the second look up table 108b) of the wireless communication device 200 together with information of the current position and/or orientation of the wireless communications device 200 (determined from the second look up table 108b) is used to calculate the actual region in the environment of the lighting system 100 in which the light will be modified (the "Interaction Zone") by the lighting system 100. The Interaction Zone is the region in the environment of the lighting system 100 defined by movement of the tracked spot. Expressed in another way, the Interaction Zone is defined as the volume in space that has received a brush stroke.

Figure 6:
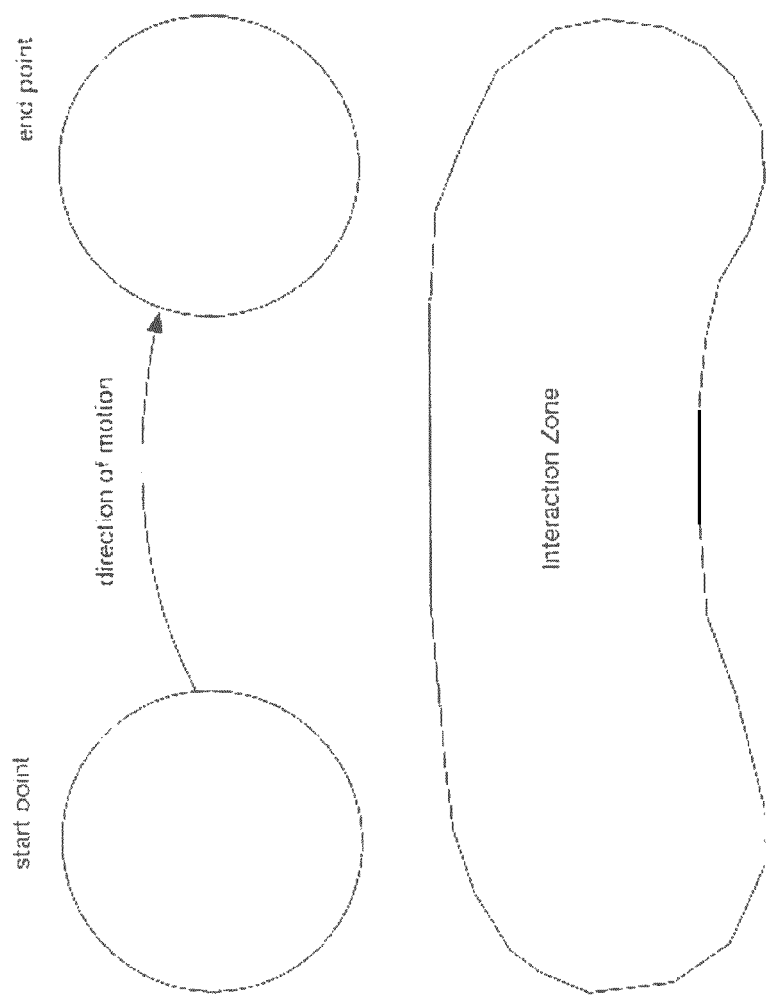
FIG. 6 illustrates an interaction zone.

FIG. 6 illustrates an example Interaction Zone following movement of circular brush from a starting point to an end point. Note for ease of illustration the Interaction Zone has been shown in FIG. 6 in two-dimensions. However it will be appreciated from the above that the Interaction Zone may be a three-dimensional region in the environment of the lighting system 100.

At step S416, one or more of the lighting device(s) 104 of the lighting devices 104 that are to be included in the activity (indicated by the Canvas Composition parameter) that can affect the lighting in the Interaction Zone (i.e. emit light that is incident in the interaction zone) are determined by the controller 102 by comparing the Interaction Zone with the data stored in the first look-up table 108a (the position of each of the lighting device(s) 104 in the environment of the lighting system 100).

In addition, at step S416 the controller 102 ascertains the capabilities of each of the one or more of the lighting device(s) 104 that can affect the lighting in the Interaction Zone. These capabilities may include for example the colors that a lighting device can support, the maximum brightness level of light that a light device can emit etc. This information may be gathered directly by the controller 102 communicating with each of the one or more of the lighting device(s) 104 that can affect the lighting in the Interaction Zone. Alternatively, a lighting device 104 may provide a code to the controller 102, and the controller 102 may use this code to look up the capabilities of the lighting device in a remote database coupled to the controller 102.

At step S418, the controller 102 determines the closest match of settings to those defined by the Requested_Modification parameter that the one or more of the lighting device(s) 104 that can affect the lighting in the Interaction Zone can support. This closest match of setting is defined as the "Actual_Modification".

It will be appreciated that in certain scenarios the Actual_Modification will be the same as the Requested_Modification, however in other scenarios the Actual_Modification will be different to the Requested_Modification.

At step S420, the controller 102 modifies the settings of the one or more of the lighting device(s) 104 that can affect the lighting in the Interaction Zone such that the Actual_Modification settings are applied.

Thus, if a room had four lighting devices, the controller 102 is configured to (i) determine which of the 4 lighting devices can be used for the activity (determined based on the Canvas Composition parameter)—call this Group A; (ii) calculate the Interaction Zone (by calculating the Relative_Geometric_Region parameter and detecting movement of the wireless communication device 200); (iii) determine which of the lighting devices in Group A can affect the Interaction Zone; and (iv) control the settings of the lighting devices in Group A accordingly based on the Requested_Modification parameter.

At step S422, the controller 102 is configured to detect whether the wireless communication device 200 is still moving based on the position and/or orientation information of the wireless communication device 200 received from the wireless receiver 110 via input 114a and/or from the sensor 112 via input 114b.

If the controller 102 detects that the wireless communication device 200 is still moving at step S422 the process 400 proceeds back to step S414 otherwise the process 400 ends.

Thus, after each set increment in time as the wireless communication device 200 moves in the environment of the lighting system 100 step S414 is performed by the controller.

This increment in time is configured by the controller 102, for example it may be set by a provider of the lighting system.

It will be appreciated from the above that embodiments of the present disclosure provides the ability for the user of the wireless communication device 200 to apply color and light to a room or any other space via the lighting system 100 using actions and methodologies akin to painting on a canvas. This may be a preferred type of interface for some users. That is, during a first interaction the user interacts with the wireless communication device 200 to define a set of parameters that enables the wireless communication device 200 to be used in the manner of a paintbrush, and during a second interaction the user moves the wireless communication device 200 and the wireless communication device 200 interacts with the lighting system 100 in a manner akin to a paintbrush applying color to a canvas.

Thus, embodiments of the present disclosure allow the user of the wireless communication device 200 to "paint" within his surroundings whereby the canvas is the environment of the lighting system where the user is located.

In the process 400 described above, the controller 102 is configured to control lighting device(s) 104 to emit light onto the region in the environment defined by the movement of the tracked spot (the Interaction Zone) in accordance with the Requested_Modification dynamically as the controller 102 tracks movement of the spot based on the received location and/or orientation information.

Figure 4:
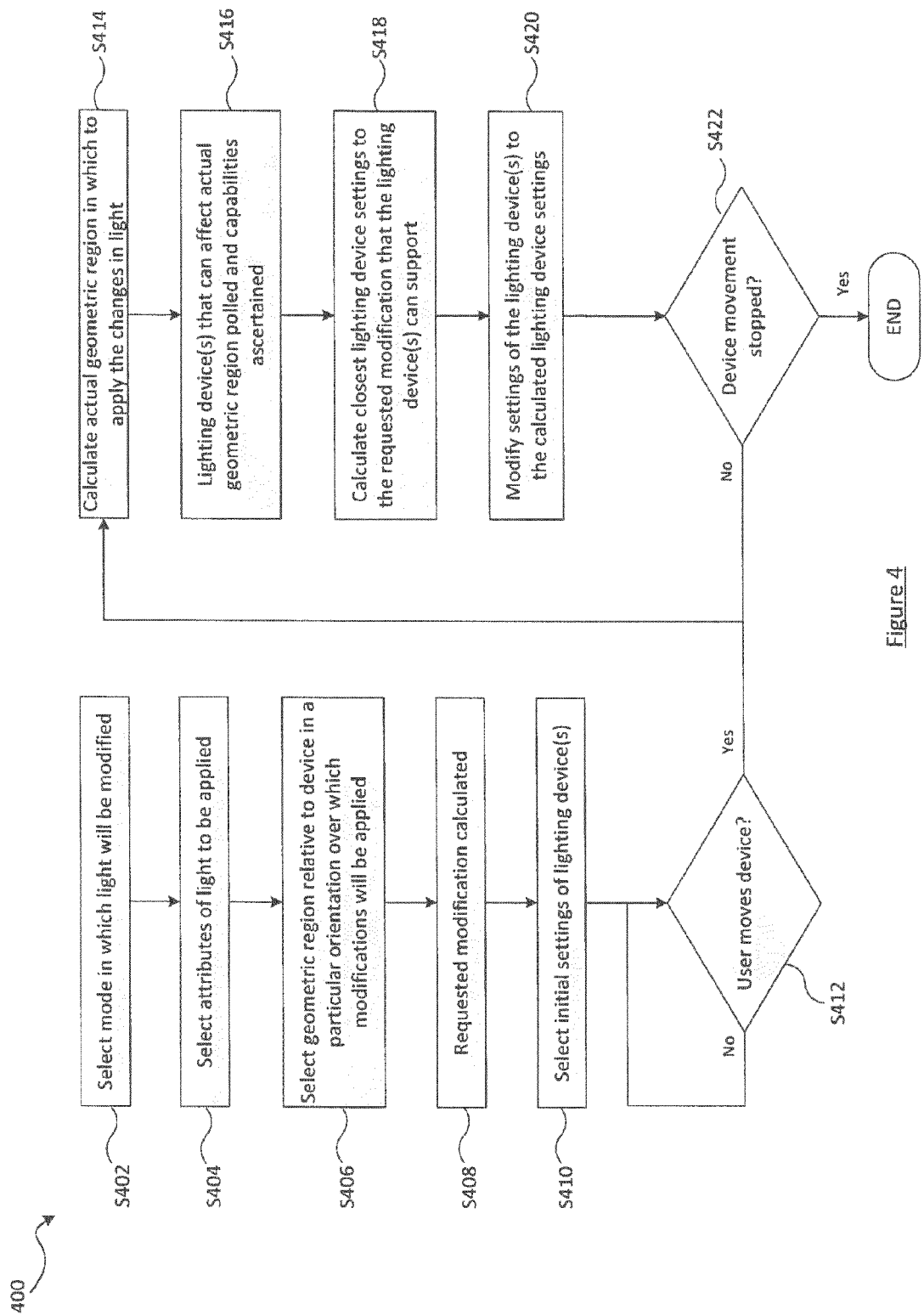
FIG. 4 is a flow chart of a process for controlling one or more lighting devices of a lighting system.

The steps of FIG. 4 may not be implemented in the order shown. For example, in alternative embodiments, step S420 may only be implemented after the user of the wireless communication device 200 has stopped moving the wireless communication device 200.

The lighting control software application 216 may provide various other functionalities associated with painting in addition to that described above, for example the user interface provided by the lighting control software application 216 may enable the user of the wireless communication device 200 to modify the light emitted in the spot by deleting color, applying washes, applying filters etc.

It will be appreciated the above embodiments have been described only by way of example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
   an output for controlling one or more lighting devices to emit light into an environment; and
   one or more inputs for receiving position and/or orientation information of a wireless communication device and user-defined parameters transmitted from said wireless communications device based on a first interaction between a user and the wireless communication device;
   wherein the controller is configured to:
   determine a spot in said environment towards which the wireless communication device is directed based on the received position and/or orientation information;
   during a second interaction, detect movement of the wireless communication device and track movement of the spot based on the received location and/or orientation information by using said position and/or orientation information to calculate a region in the environment defined by the movement of the tracked spot between a starting point and an end point and control the one or more lighting devices to modify the light in said region based on at least one of the received user-defined parameters; and
   determine the spot in said environment towards which the wireless communication device is directed based on one or more of said user-defined parameters in addition to the received position and/or orientation information.

2. The controller of claim 1, wherein the one or more of said user-defined parameters used to determine the spot in said environment towards which the wireless communication device is directed comprise a size and/or shape of the spot.

3. The controller according to claim 1, wherein the at least one of the received user-defined parameters comprise a mode indicating how the light emitted onto said region by the one or more lighting devices is to be modified.

4. The controller according to claim 1, wherein the at least one of the received user-defined parameters comprise one or more attributes of the light to be emitted onto said region by the one or more lighting devices.

5. The controller according to claim 4, wherein the one or more attributes comprise a color of the light to be emitted onto said region by the one or more lighting devices.

6. The controller according to claim 4, wherein the one or more attributes comprise a softness of the light to be emitted onto said region by the one or more lighting devices.

7. The controller according to claim 1, wherein the controller is configured to select the one or more lighting devices to be controlled based on capabilities of the one or more lighting devices.

8. A lighting system comprising:
   a controller according to claim 1;
   one or more lighting devices coupled to said controller, the one or more lighting devices operable to emit light into an environment; and
   a wireless receiver coupled to said controller the wireless receiver configured to receive said parameters.

9. The lighting system according to claim 8, wherein the input is coupled to the wireless receiver, the wireless receiver configured to receive the position and/or orientation information of the wireless communication device transmitted from said wireless communication device.

10. The lighting system according to claim 8, further comprising a sensor coupled to said input, the sensor configured to detect the position and/or orientation information of the wireless communication device.

11. The lighting system according to claim 10 wherein the sensor comprises one or any combination of a complementary metal oxide semiconductor image sensor, a charge coupled device image sensor, and a time of flight sensor.

12. A controller comprising:
an output for controlling one or more lighting devices to emit light into an environment; and
one or more inputs for receiving position and/or orientation information of a wireless communication device and user-defined parameters transmitted from said wireless communications device based on a first interaction between a user and the wireless communication device;
wherein the controller is configured to:
determine a spot in said environment towards which the wireless communication device is directed based on the received position and/or orientation information;
during a second interaction, detect movement of the wireless communication device and track movement of the spot based on the received location and/or orientation information by using said position and/or orientation information to calculate a region in the environment defined by the movement of the tracked spot between a starting point and an end point and control the one or more lighting devices to modify the light in said region based on at least one of the received user-defined parameters; and
select the one or more lighting devices to be controlled based on a determination that the one or more lighting devices are positioned in said environment to emit light onto said region.

13. The controller according to claim 12, wherein the controller is coupled to a memory storing position information of the one or more lighting devices, and the controller is configured to make said determination based on comparing said region with the position information.

14. A lighting system comprising:
a controller according to claim 12;
one or more lighting devices coupled to said controller, the one or more lighting devices operable to emit light into an environment; and
a wireless receiver coupled to said controller the wireless receiver configured to receive said parameters.

15. The lighting system according to claim 14, wherein the input is coupled to the wireless receiver, the wireless receiver configured to receive the position and/or orientation information of the wireless communication device transmitted from said wireless communication device.

16. The lighting system according to claim 14, further comprising a sensor coupled to said input, the sensor configured to detect the position and/or orientation information of the wireless communication device.

17. The lighting system according to claim 16, wherein the sensor comprises one or any combination of a complementary metal oxide semiconductor image sensor, a charge coupled device image sensor, and a time of flight sensor.

18. A computer program product to control a lighting system comprising one or more lighting devices operable to emit light into an environment, the computer program product comprising code embodied on a non-transitory computer-readable medium and being configured so as when executed on a processor configured, to:
receive position and/or orientation information of a wireless communication device, and user-defined parameters transmitted from said wireless communications device based on a first interaction between a user and the wireless communication device;
determine a spot in said environment towards which the wireless communication device is directed based on the received position and/or orientation information;
during a second interaction, detect movement of the wireless communication device and track movement of the spot based on the received location and/or orientation information by using said position and/or orientation information to calculate a region in the environment defined by the movement of the tracked spot between a starting point and an end point and control the one or more lighting devices to modify the light in said region based on at least one of the received user-defined parameters; and
determine the spot in said environment towards which the wireless communication device is directed based on one or more of said user-defined parameters in addition to the received position and/or orientation information.

19. A computer program product to control a lighting system comprising one or more lighting devices operable to emit light into an environment, the computer program product comprising code embodied on a non-transitory computer-readable medium and being configured so as when executed on a processor configured, to:
receive position and/or orientation information of a wireless communication device, and user-defined parameters transmitted from said wireless communications device based on a first interaction between a user and the wireless communication device;
determine a spot in said environment towards which the wireless communication device is directed based on the received position and/or orientation information;
during a second interaction, detect movement of the wireless communication device and track movement of the spot based on the received location and/or orientation information by using said position and/or orientation information to calculate a region in the environment defined by the movement of the tracked spot between a starting point and an end point and control the one or more lighting devices to modify the light in said region based on at least one of the received user-defined parameters; and
select the one or more lighting devices to be controlled based on a determination that the one or more lighting devices are positioned in said environment to emit light onto said region.

* * * * *